(12) United States Patent
Ting et al.

(10) Patent No.: US 9,418,708 B2
(45) Date of Patent: Aug. 16, 2016

(54) DATA-STORAGE DEVICE MOUNTING APPARATUS

(71) Applicant: HON HAI PRECISION INDUSTRY CO., LTD., New Taipei (TW)

(72) Inventors: Yu-Chen Ting, New Taipei (TW); Chih-Hang Chao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 111 days.

(21) Appl. No.: 14/517,563

(22) Filed: Oct. 17, 2014

(65) Prior Publication Data

US 2015/0153790 A1    Jun. 4, 2015

(30) Foreign Application Priority Data

Dec. 2, 2013   (TW) .............................. 102144008 A (51) Int. Cl.
*G06F 1/18* (2006.01)
*G11B 33/12* (2006.01)
*G11B 33/02* (2006.01)

(52) U.S. Cl.
CPC ............ *G11B 33/124* (2013.01); *G11B 33/025* (2013.01)

(58) Field of Classification Search
CPC ....................................................... G06F 1/187
USPC .................................................... 361/679.33
See application file for complete search history.

(56) References Cited

U.S. PATENT DOCUMENTS

| 6,927,973 B2* | 8/2005 | Song | H05K 7/1411 |
| | | | 312/223.1 |
| 7,817,413 B2* | 10/2010 | Peng | G06F 1/187 |
| | | | 361/679.33 |
| 8,547,690 B2* | 10/2013 | Hu | G06F 1/187 |
| | | | 206/308.1 |
| 2011/0134598 A1* | 6/2011 | Hsiao | G06F 1/187 |
| | | | 361/679.33 |
| 2013/0020453 A1* | 1/2013 | Ting | G06F 1/187 |
| | | | 248/220.21 |
| 2013/0083459 A1* | 4/2013 | Chen | G06F 1/187 |
| | | | 361/679.01 |
| 2013/0092807 A1* | 4/2013 | Chen | G06F 1/187 |
| | | | 248/220.21 |
| 2013/0099640 A1* | 4/2013 | Hu | G11B 33/124 |
| | | | 312/223.2 |
| 2014/0251678 A1* | 9/2014 | Chen | H05K 5/0221 |
| | | | 174/520 |
| 2015/0029656 A1* | 1/2015 | Lu | G11B 33/124 |
| | | | 361/679.39 |
| 2015/0043152 A1* | 2/2015 | Zhang | G06F 1/187 |
| | | | 361/679.37 |

* cited by examiner

*Primary Examiner* — Lisa Lea Edmonds
(74) *Attorney, Agent, or Firm* — ScienBiziP, P.C.

(57) ABSTRACT

A data-storage device mounting apparatus includes an enclosure and one or more elastic members. The enclosure includes a shell and a cover. The elastic member includes a mounting portion mounted on the cover, a deformable portion, and an engaging portion. The mounting portion is attached to a first end of the deformable portion and the engaging portion attached to a second end of the deformable portion. The first deformable portion end is opposite the second deformable portion. The shell defines an opening, a cavity, and an engaging hole. The engaging portion engages with the engaging hole when the cover is engaged with the shell to substantially cover the shell opening. The engaging portion may be disengaged from the engaging hole allowing the cover to be disengaged from the shell. The data-storage device is positioned within the cavity when the cover is engaged with the shell.

20 Claims, 7 Drawing Sheets

DATA-STORAGE DEVICE MOUNTING APPARATUS

CROSS-REFERENCE TO RELATED APPLICATIONS

This application claims priority to Taiwanese Patent Application No. 102144008 Dec. 2, 2013 in the Taiwan Intellectual Property Office, the contents of which are incorporated by reference herein.

FIELD

The subject matter herein generally relates to a mounting apparatus for a data-storage device.

BACKGROUND

A mounting apparatus is used to secure a data-storage device to an electronic device.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "inside" indicates that at least a portion of a region is partially contained within a boundary formed by the object. The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "comprising, but not necessarily limited to"; it specifically indicates open-ended inclusion or membership in the so-described combination, group, series and the like.

The present disclosure is described in relation to a mounting apparatus for securing a data-storage device.

Figure 1:
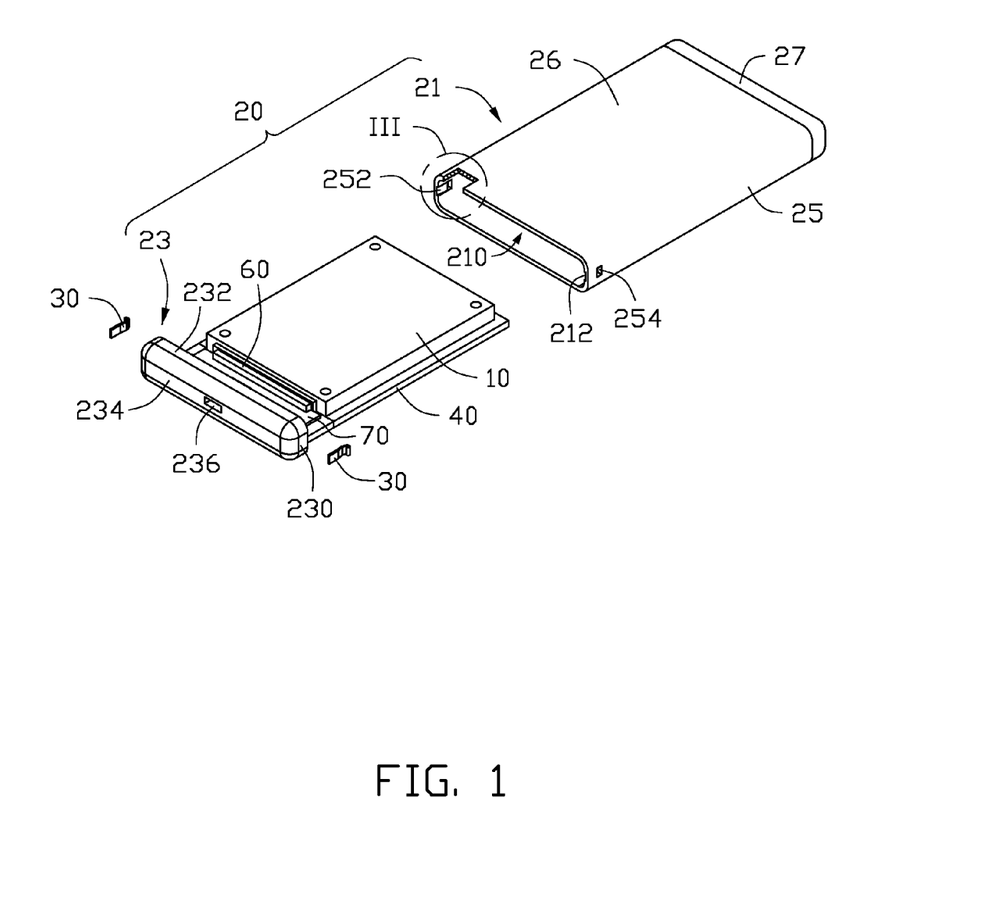
FIG. 1 is an exploded, isometric view of an embodiment of a data-storage device mounting apparatus, a shell is partially shown.

FIG. 1 illustrates an embodiment of a data-storage device mounting apparatus. The data-storage device mounting apparatus comprises an enclosure 20 for receiving a data-storage device 10, two elastic members 30, and a loading plate 40. A first connector 50 (shown in FIG. 4) and a second connector 60 (shown in FIG. 4) are mounted on the loading plate 40. The second connector 60 is configured to insert into the data-storage device 10. The first connector 50 and the second connector 60 are mounted on a circuit board 70. The circuit board 70 is mounted on the loading plate 40. In one embodiment, the data-storage device 10 is a mobile hard disk drive.

Figure 2:
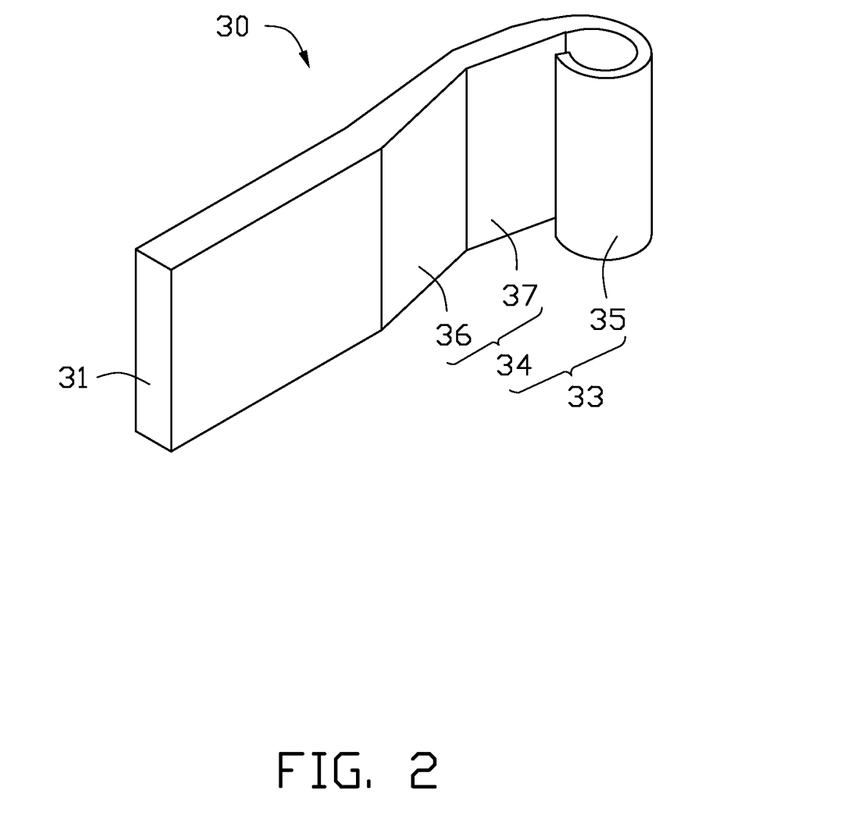
FIG. 2 is an isometric view of an elastic member of the data-storage device mounting apparatus of FIG. 1.

FIG. 2 illustrates that each elastic member 30 comprises a mounting portion 31 and a bent portion 33. The mounting portion 31 is substantially square. The bent portion 33 comprises a deformable portion 34 and an engaging portion 35. The deformable portion 34 comprises a connecting portion 36 extending inward from the mounting portion 31 and an extending portion 37 extending outward from the connecting portion 36. The engaging portion 35 extends outward from the extending portion 37. A first obtuse angle is defined between the mounting portion 31 and the connecting portion 36. A second obtuse angle is defined between the extending portion 37 and the connecting portion 36.

Figure 3:
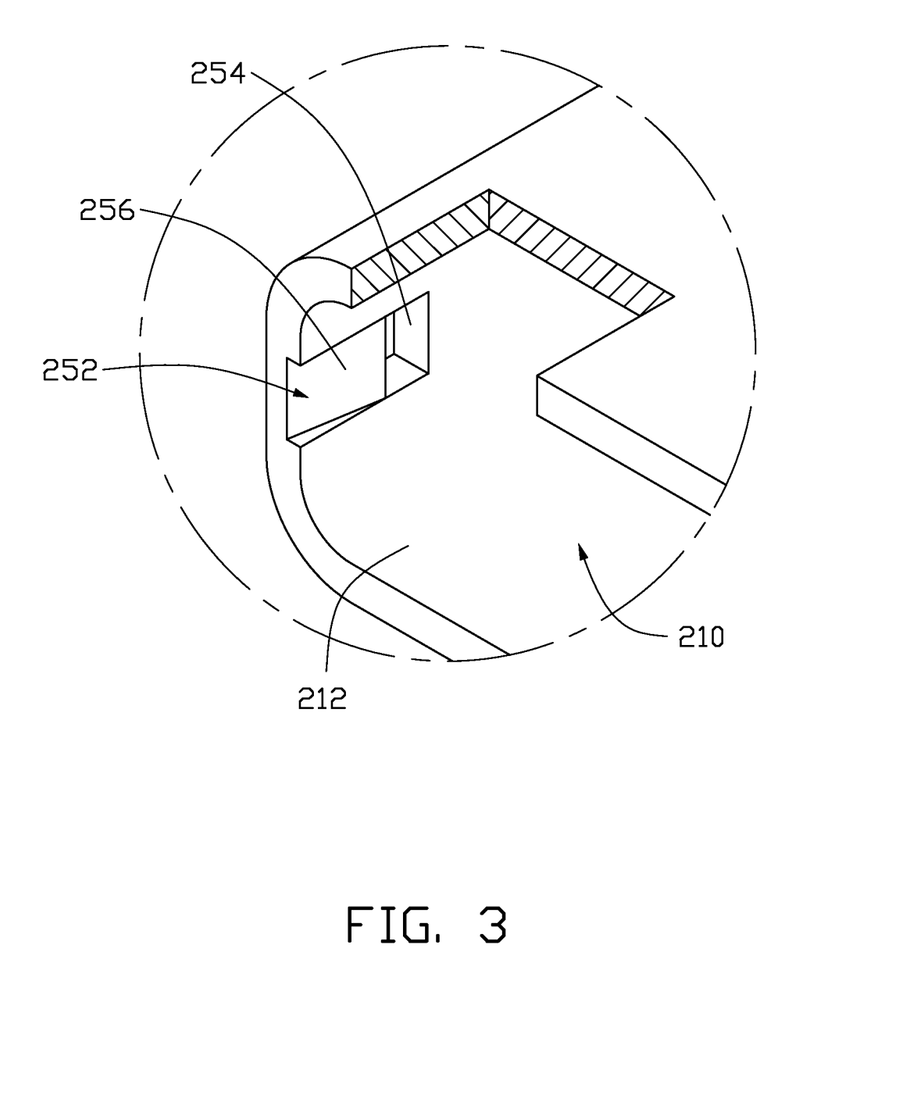
FIG. 3 is an enlarged view of a circled portion III of FIG. 2.
Figure 4:
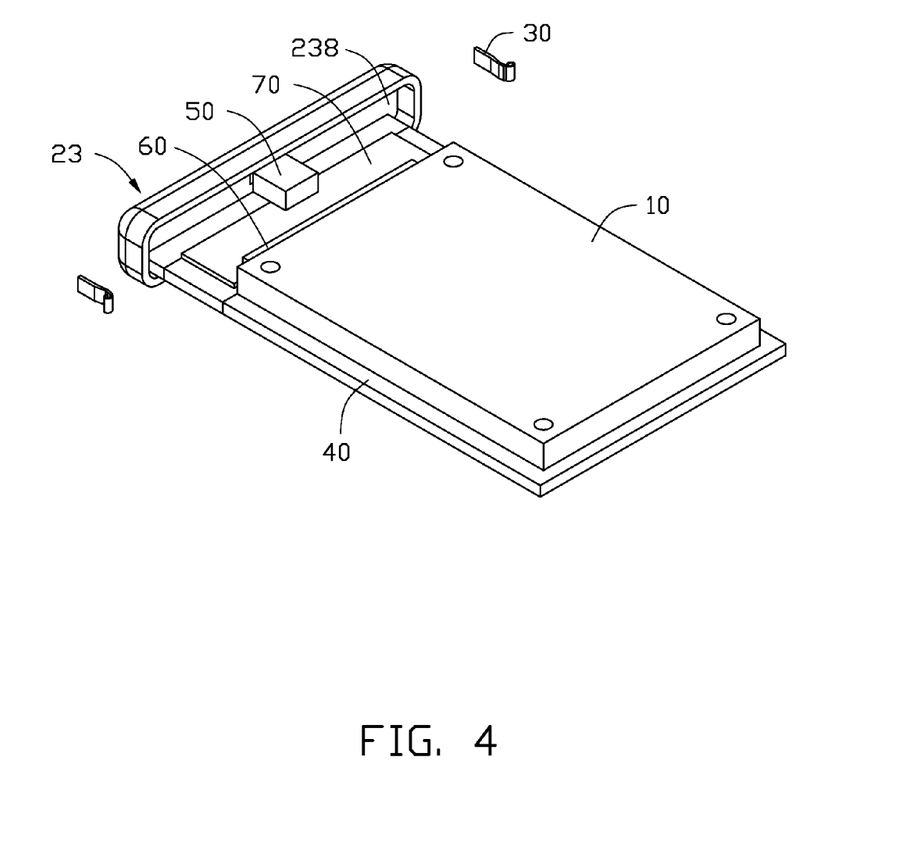
FIG. 4 is similar to FIG. 1, but without the shell.

FIGS. 3 and 4 illustrate that the enclosure 20 comprises a shell 21 and a cover 23 for covering the shell 21. The shell 21 is hollow, and defines a cavity 210 for receiving the data-storage device 10 and an opening 212. The shell 21 comprises two first side walls 25, two second side walls 26 parallel to each other, and a bottom wall 27. The two first side walls 25 are connected between the two second side walls 26. The bottom wall 27 is connected between the first side walls 25 and the second side walls 26. The first side walls 25, the two second side walls 26, and the bottom wall 27 cooperatively surround the cavity 210. The first side walls 25 and the two second side walls 26 cooperatively surround the opening 212. Each first side wall 25 defines a sliding groove 252 and an engaging hole 254. The sliding groove 252 comprises an inclined sliding surface 256.

The cover 23 comprises two first side portions 230, two second side portions 232, and a front portion 234. The two first side portions 230 connect between the two second side portions 232. The front portion 234 connects between the first side portions 230 and the second side portions 232. The front portion 234 defines an inserting hole 236. One elastic member 30 is mounted in the inside of one corresponding first side portion 230. The cover 23 defines a receiving portion 238. The two first side portions 230, the two second side portions 232, and the front portion 234 cooperatively surround the receiving portion 238.

Figure 5:
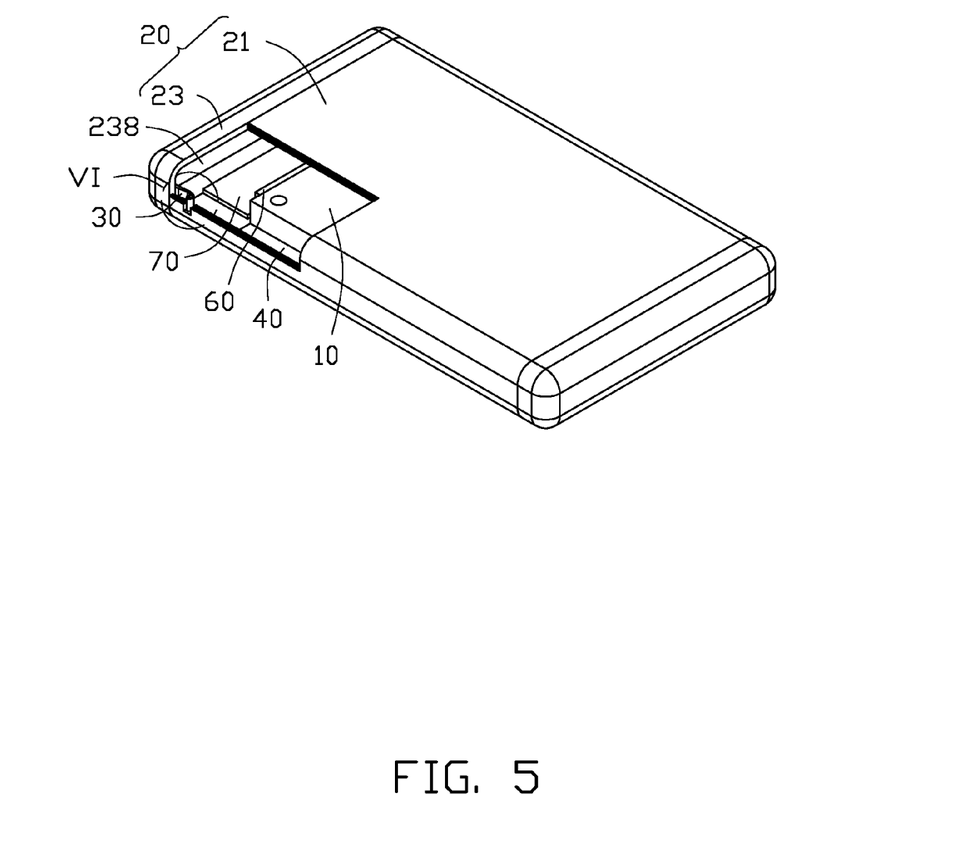
FIG. 5 is an assembled view of the data-storage device mounting apparatus of FIG. 1.
Figure 6:
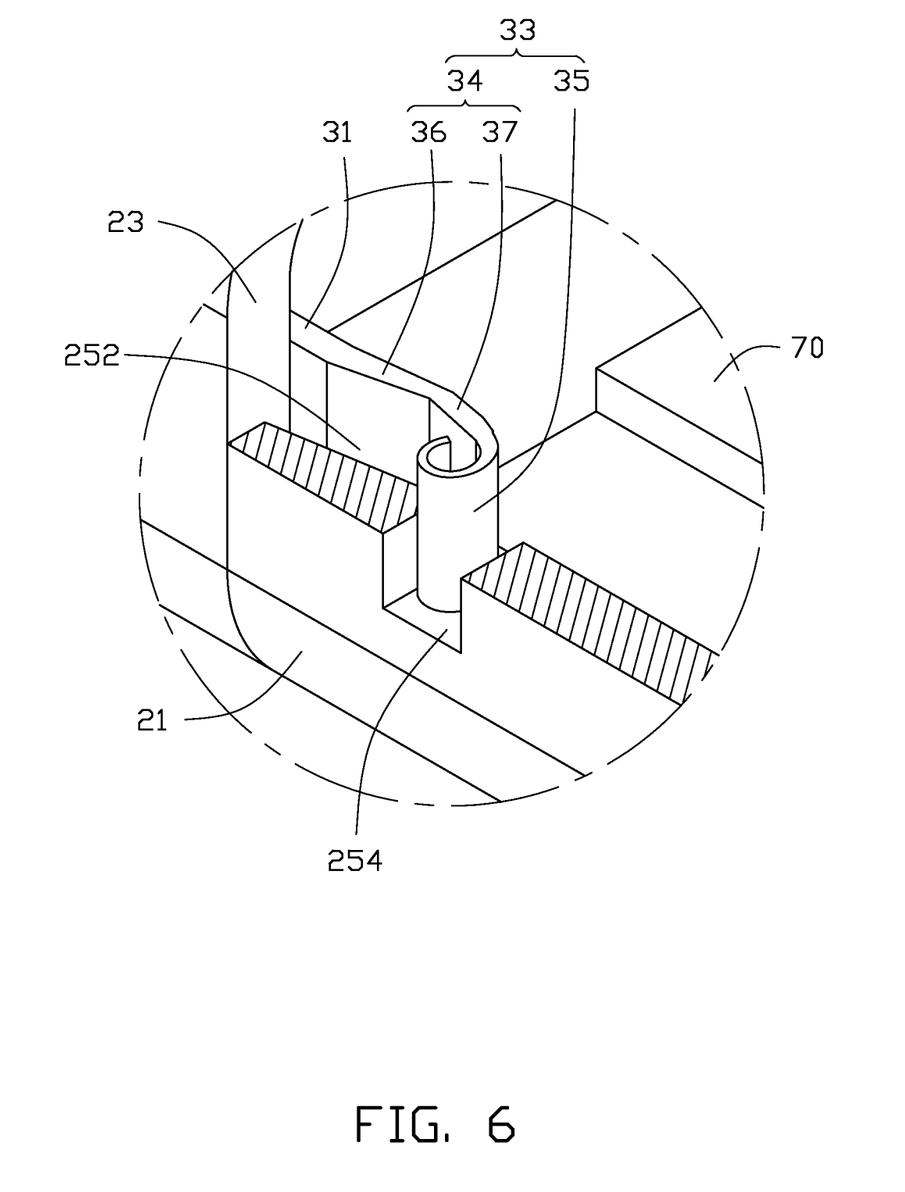
FIG. 6 is an enlarged view of a circled portion VI of FIG. 5.
Figure 7:
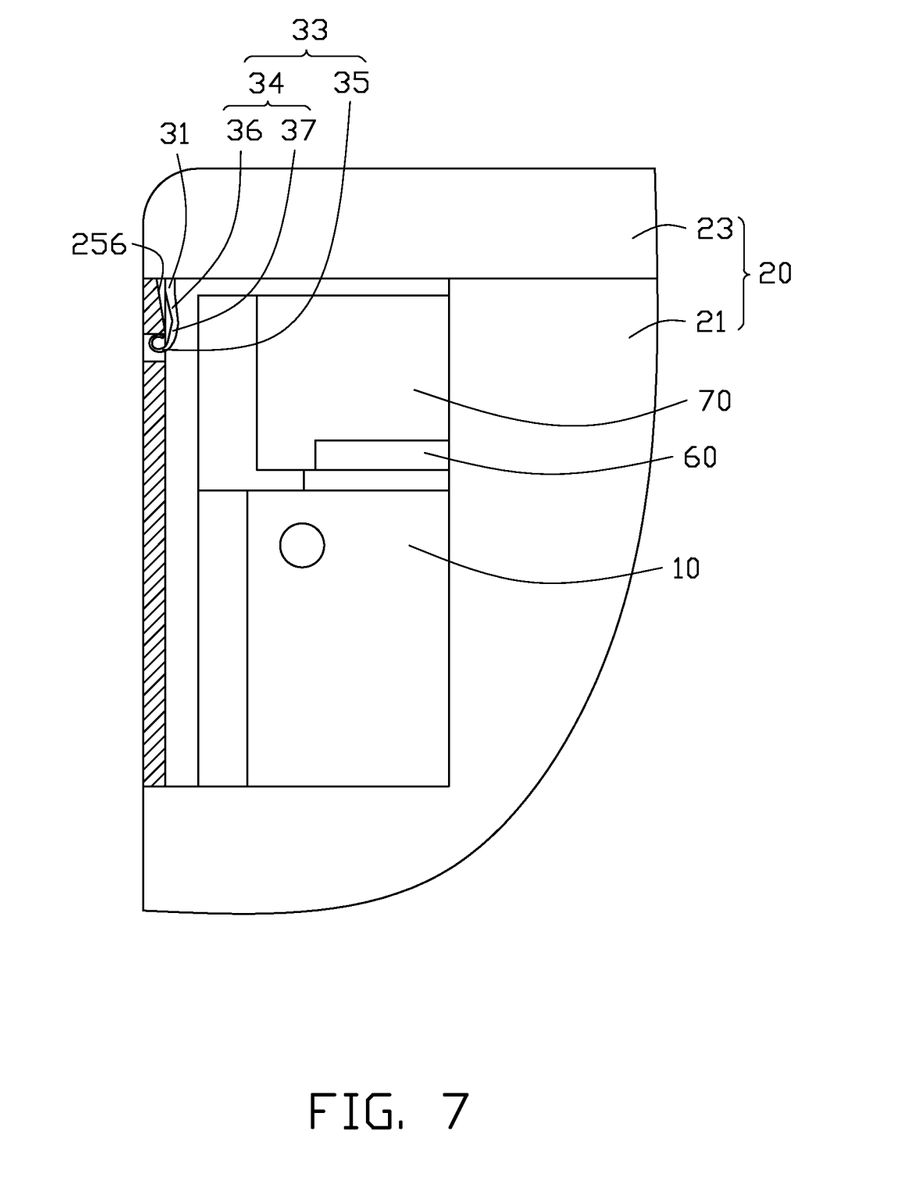
FIG. 7 is a partially sectional view of the data-storage device mounting apparatus of FIG. 5.

FIGS. 5-7 illustrate that in use, each mounting portion 31 is secured to the first side portions 230 by pasting or by welding, or by other methods. The data-storage device 10 is fastened to the loading plate 40 by fasteners. The data-storage device 10, the first connector 50, the second connector 60, and the circuit 70 are placed in the cavity 210 from the opening 212. The cover 23 is moved and the opening 212 is aligned with the receiving portion 238. The engaging portion 35 abuts against the sliding surface 256. The connecting portion 36 is deformed to move the extending portion 37. The sliding groove 252 guides the engaging portion 35 to slide along the sliding surface 256 to an edge of the engaging hole 254. The connecting portion 36 rebounds to move the extending portion 37; thereby enabling the engaging portion 35 to engage in the engaging hole 254. The first connector 50 is aligned with the inserting hole 236 and located in the cover 23. The cover 23 covers the opening 212. To disassemble the data-storage device 10, the engaging portion 35 is pressed; the deformable portion 34 is elastically deformed to enable the engaging portion 35 to disengage from the engaging hole 254. The cover 23 is moved. The engaging portion 35 abuts against the sliding surface 256. The sliding groove 252 guides the engaging portion 35 to slide along the sliding surface 256. The cover 23 is disengaged from the shell 21. The data-storage device 10 is removed from the opening 212. The data-storage device 10 is moved to disengage from the loading plate 40 and to disengage from the second connector 60.

It is to be understood that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A data-storage device mounting apparatus comprising:
an enclosure having:
a shell defining a cavity, the shell having an opening and one or more engaging holes;
a cover engagable with the shell to substantially cover the shell opening; and
a data-storage device mount attached to the enclosure cover; and
one or more elastic members, each elastic member having a mounting portion, a deformable portion and an engaging portion with the mounting portion attached to a first end of the deformable portion and the engaging portion attached to a second end of the deformable portion, the first deformable portion end being opposite the second deformable portion;
wherein, the mounting portion of at least one of the one or more elastic members is attached to the enclosure cover;
wherein, an engaging portion of at least one of the one or more elastic members engages with at least one of the one or more engaging holes when the cover is engaged with the shell to substantially cover the shell opening;
wherein, the engaging portion of the at least one of the one or more elastic members may be disengaged from the at least one or more engaging holes allowing the cover to be disengaged from the shell; and
wherein, the data-storage device is positioned within the cavity when the enclosure cover is engaged with the enclosure shell.

2. The data-storage device mounting apparatus of claim 1, wherein shell further defines a sliding groove guiding the engaging portion to slide to engage in the engaging hole.

3. The data-storage device mounting apparatus of claim 2, wherein the sliding groove comprises an inclined sliding surface and the sliding surface guides the engaging portion to slide to engage in the engaging hole.

4. The data-storage device mounting apparatus of claim 2, wherein the shell comprises two first side walls and two second side walls coupled to the two first side walls, the engaging hole and the sliding groove are defined in one of the two first side walls, and the two second side walls and the two first side walls cooperatively surround the cavity.

5. The data-storage device mounting apparatus of claim 4, wherein the two second side walls and the two first side walls cooperatively surround the opening; and the engaging portion engages in the engaging hole to enable the shell to cover the opening.

6. The data-storage device mounting apparatus of claim 1, wherein the deformable portion comprises a connecting portion extending inward from the mounting portion.

7. The data-storage device mounting apparatus of claim 6, wherein a first obtuse angle is defined between the mounting portion and the connecting portion.

8. The data-storage device mounting apparatus of claim 6, wherein the deformable portion further comprises an extending portion extending outward from the connecting portion and the engaging portion extends outward from the extending portion.

9. The data-storage device mounting apparatus of claim 8, wherein a second obtuse angle is defined between the extending portion and the connecting portion.

10. The data-storage device mounting apparatus of claim 1, further comprises a loading plate receiving in the cavity, wherein a circuit board is mounted on the loading plate and receives in the cavity and mounts to a connector, the shell defines an inserting hole corresponding to the connector.

11. A data-storage device mounting apparatus comprising:
an enclosure having:
a shell defining a cavity, the shell having an opening and one or more engaging holes;
a cover engagable with the shell to substantially cover the shell opening; and
a data-storage device mount attached to the enclosure cover; and
one or more elastic members, each elastic member having a deformable portion and an engaging portion coupled to the deformable portion;
wherein, an engaging portion of at least one of the one or more elastic members engages with at least one of the one or more engaging holes when the cover is engaged with the shell to substantially cover the shell opening;
wherein, the engaging portion of the at least one of the one or more elastic members may be disengaged from the at least one or more engaging holes allowing the cover to be disengaged from the shell; and
wherein, the data-storage device mount is positioned within the cavity when the enclosure cover is engaged with the enclosure shell.

12. The data-storage device mounting apparatus of claim 11, wherein shell further defines a sliding groove guiding the engaging portion to slide to engage in the engaging hole.

13. The data-storage device mounting apparatus of claim 12, wherein the sliding groove comprises an inclined sliding surface and the sliding surface guides the engaging portion to slide to engage in the engaging hole.

14. The data-storage device mounting apparatus of claim 12, wherein the shell is hollow and comprises two first side walls and two second side walls coupled to the two first side walls, the engaging hole and the sliding groove are defined in one of the two first side walls, and the two second side walls and the two first side walls cooperatively surround the cavity.

15. The data-storage device mounting apparatus of claim 14, wherein the two second side walls and the two first side walls cooperatively surround the opening, and the engaging portion engages in the engaging hole to enable the shell to cover the opening.

16. The data-storage device mounting apparatus of claim 11, wherein a mounting portion of at least one of the one or more elastic members is attached to the enclosure cover, the mounting portion is attached to a first end of the deformable portion, the engaging portion is attached to a second end of the deformable portion, and the first deformable portion end being opposite the second deformable portion.

17. The data-storage device mounting apparatus of claim 16, wherein the deformable portion comprises a connecting portion extending inward from the mounting portion and an extending portion extending outward from the connecting portion, and the engaging portion extends outward from the extending portion.

18. The data-storage device mounting apparatus of claim 17, wherein a first obtuse angle is defined between the mounting portion and the connecting portion.

19. The data-storage device mounting apparatus of claim 17, wherein a second obtuse angle is defined between the extending portion and the connecting portion.

20. The data-storage device mounting apparatus of claim 11, wherein the engaging portion is substantially bent.

* * * * *